US008933927B2

(12) United States Patent
Kim et al.

(10) Patent No.: US 8,933,927 B2
(45) Date of Patent: Jan. 13, 2015

(54) DISPLAY SYSTEM WITH IMAGE CONVERSION MECHANISM AND METHOD OF OPERATION THEREOF

(75) Inventors: Yeong-Taeg Kim, Irvine, CA (US); Yoon Kyung Kim, Costa Mesa, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 723 days.

(21) Appl. No.: 13/160,383

(22) Filed: Jun. 14, 2011

(65) Prior Publication Data

US 2012/0056873 A1    Mar. 8, 2012

Related U.S. Application Data

(60) Provisional application No. 61/379,688, filed on Sep. 2, 2010.

(51) Int. Cl.
  *G06T 15/00*    (2011.01)
  *G06T 11/20*    (2006.01)
  *H04N 13/02*    (2006.01)
  *G06T 7/00*    (2006.01)

(52) U.S. Cl.
  CPC .......... *H04N 13/026* (2013.01); *H04N 13/0271* (2013.01); *G06T 7/0051* (2013.01)
  USPC .......................................... 345/419; 345/440

(58) Field of Classification Search
  CPC ............... G06T 7/0051; H04N 13/026; H04N 13/0271; B62J 15/00
  See application file for complete search history.

(56) References Cited

U.S. PATENT DOCUMENTS

| 5,282,061 | A * | 1/1994 | Farrell .......................... 358/464 |
| 6,477,267 | B1 | 11/2002 | Richards |
| 7,573,475 | B2 | 8/2009 | Sullivan et al. |
| 7,573,489 | B2 | 8/2009 | Davidson et al. |
| 2008/0192067 | A1 | 8/2008 | Barenbrug et al. |
| 2008/0225045 | A1 | 9/2008 | Birtwistle et al. |
| 2010/0142924 | A1 | 6/2010 | Yamashita et al. |

OTHER PUBLICATIONS

D. Comaniciu and P. Meer, "Robust Analysis of Feature Spaces: Color Image Segmentation", In Proc. of IEEE Conference on Computer Vision and Pattern Recognition, pp. 750-755, Jun. 1997.*
S. Battiato, S. Curti, M. La Cascia, M. Tortora and E. Scordato, "Depth-Map Generation by Image Classification", Three-Dimensional Image Capture and Applications VI, edited by Brian D. Corner, Peng Li, Roy P. Pargas, Proce. of SPIE-IS&T Electronic Imaging, SPIE Vo. 5302 @ 2004 SPIE and IS&T.*
S. Gould, R. Fulton and D. Koller, "Decomposing a Scene into Geometric and Semantically Consistent Regions," Computer Vision, 2009 IEEE 12th International Conference, Sep. 29-Oct. 2, 2009.*

* cited by examiner

*Primary Examiner* — Kee M Tung
*Assistant Examiner* — Sing-Wai Wu
(74) *Attorney, Agent, or Firm* — IP Investment Law Group

(57) ABSTRACT

A method of operation of a display system includes: receiving an input image having input pixels; assigning a pixel information for the input pixels corresponding to a semantic category; detecting input background pixels from the input pixels with the pixel information; identifying input foreground pixels from the input pixels with the background pixels; assigning a pixel depth to the input background pixels and input foreground pixels; generating a depth map with the input background pixels and the input foreground pixels; and generating a processed image from the input image with the depth map for displaying on a device.

20 Claims, 11 Drawing Sheets

DISPLAY SYSTEM WITH IMAGE CONVERSION MECHANISM AND METHOD OF OPERATION THEREOF

CROSS-REFERENCE TO RELATED APPLICATION(S)

This application claims the benefit of U.S. Provisional Patent Application Ser. No. 61/379,688 filed Sep. 2, 2010, and the subject matter thereof is incorporated herein by reference thereto.

TECHNICAL FIELD

The present invention relates generally to a display system, and more particularly to a system for image conversion.

BACKGROUND ART

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, gaming systems, or a personal digital assistant (PDA).

Three-dimensional display based services allow users to create, transfer, store, and/or consume information in order for users to create, transfer, store, and consume in the "real world". One such use of three-dimensional display based services is to efficiently present three-dimensional images on a display.

Three-dimensional display systems have been incorporated in projectors, televisions, notebooks, handheld devices, and other portable products. Today, these systems aid users by displaying available relevant information, such as diagrams, maps, or videos. The display of three-dimensional images provides invaluable relevant information.

However, displaying information in three-dimensional form has become a paramount concern for the consumer. Displaying a three-dimensional image that does not correlate with the real world decreases the benefit of using the three-dimensional display systems.

Thus, a need still remains for a three-dimensional display system with image conversion mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a display system including: receiving an input image having input pixels; assigning a pixel information for the input pixels corresponding to a semantic category; detecting input background pixels from the input pixels with the pixel information; identifying input foreground pixels from the input pixels with the input background pixels; assigning a pixel depth to the input background pixels and input foreground pixels; generating a depth map with the input background pixels and the input foreground pixels; and generating a processed image from the input image with the depth map for displaying on a device.

The present invention provides a display system, including: a communication unit for receiving an input image having an input pixel; a semantic assignment module, coupled to the communication unit, for assigning a pixel information for the input pixels corresponding to a semantic category; a background detection module, coupled to the semantic assignment module, for detecting input background pixels from the input pixels with the pixel information; a foreground detection module, coupled to the background detection module, for detecting input foreground pixels from the input pixels with the input background pixels; a background depth module, coupled to the semantic assignment module, for assigning pixel depth to the input background pixels; an object depth module, coupled to the background depth module; for assigning pixel depth to the input foreground pixels; a depth map module, coupled to the semantic assignment module; for generating a depth map with the input background pixels and the input foreground pixels; and an image display module, coupled to the depth map module, for generating a processed image, from the input image with the depth map, for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
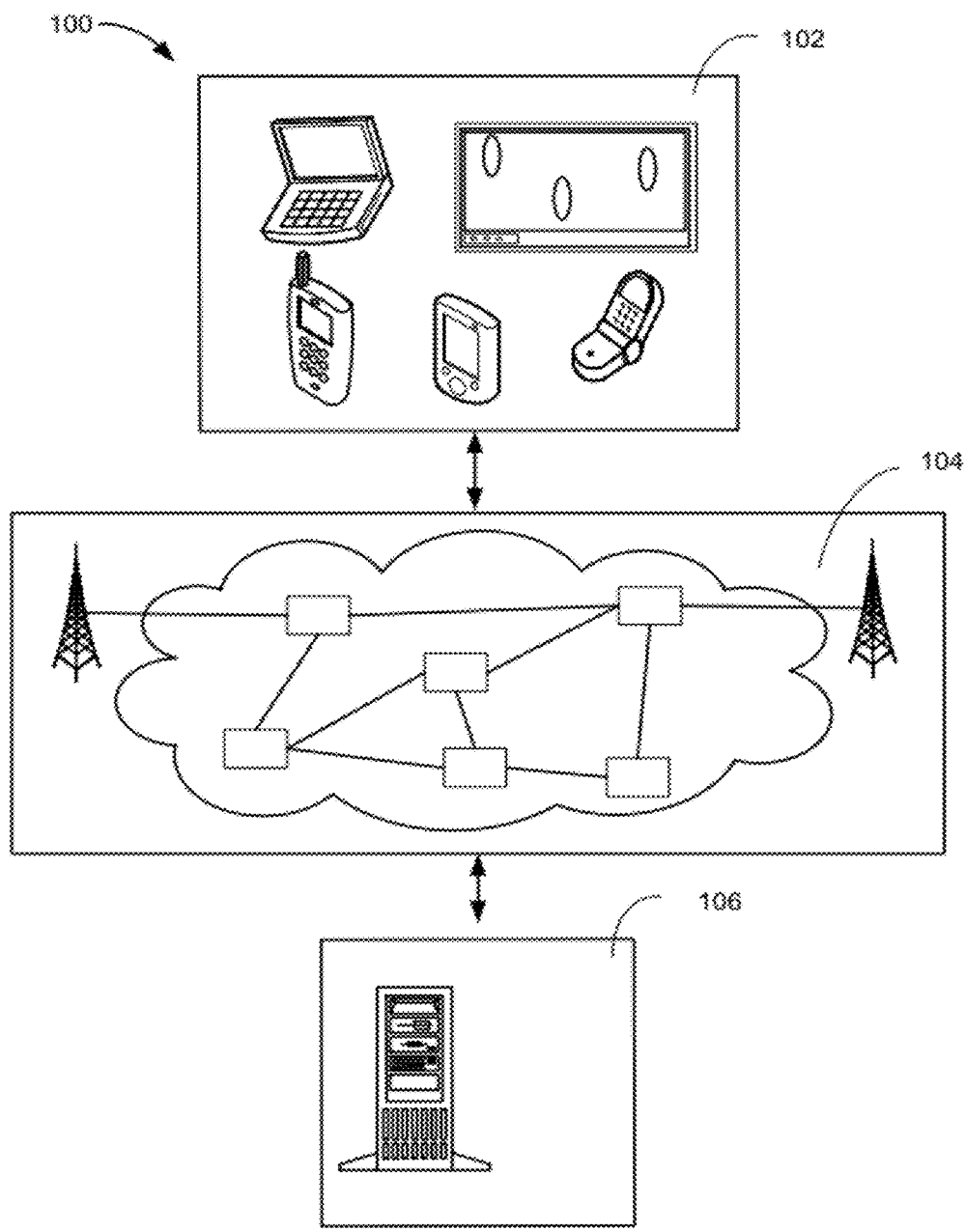
FIG. 1 is a display system with image conversion mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which image information is expressed is not critical to some embodiments of the invention. For example, in some embodiments, image information is presented in the format of (X, Y), where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof. Also for example, the hardware can be circuitry, processor, computer, integrated circuit, integrated circuit cores, a pressure sensor, an inertial sensor, a micro-electromechanical system (MEMS), passive devices, or a combination thereof.

The term "module" referred to herein includes software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a micro-electromechanical system (MEMS), passive devices, or a combination thereof.

Referring now to FIG. 1, therein is shown a display system 100 with image conversion mechanism in an embodiment of the present invention. The display system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, or other multi-functional display or entertainment device. The first device 102 can couple, either directly or indirectly, to the communication path 104 to communicate with the second device 106 or can be a stand-alone device.

For illustrative purposes, the display system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device, such as a TiVo™ or Slingbox™.

The second device 106 can be centralized in a single room, distributed across different rooms, distributed across different geographical locations, embedded within a telecommunications network. The second device 106 can have a means for coupling with the communication path 104 to communicate with the first device 102.

For illustrative purposes, the display system 100 is described with the second device 106 as a computing device, although it is understood that the second device 106 can be different types of devices. Also for illustrative purposes, the display system 100 is shown with the second device 106 and the first device 102 as end points of the communication path 104, although it is understood that the display system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
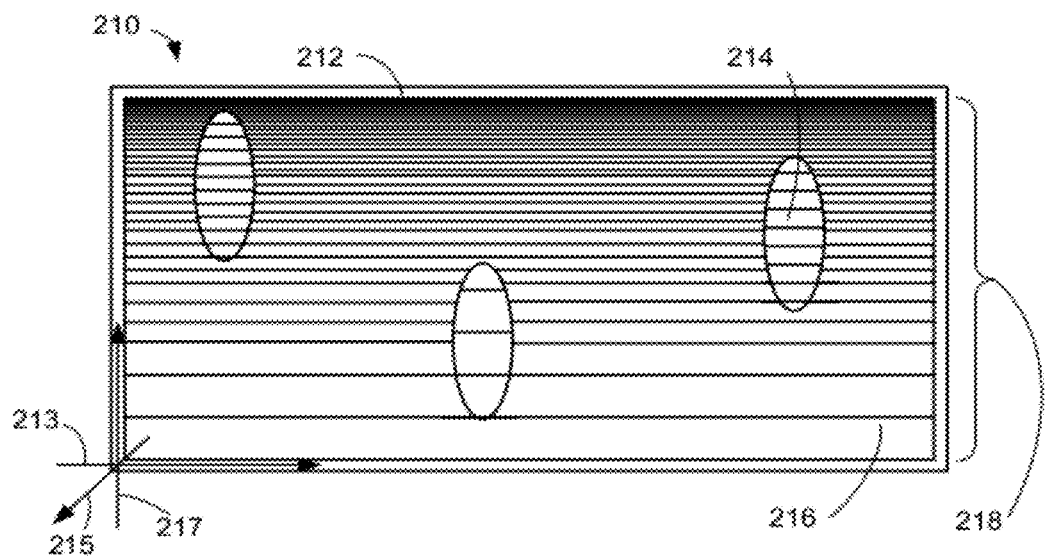
FIG. 2 is an example of a display interface of the first device of FIG. 1.

Referring now to FIG. 2, therein is shown an example of a display interface 210 of the first device 102 of FIG. 1. The display interface 210 is a physical device for presenting the image or the multi-media presentations. For example, the display interface can be a screen, including an LCD panel, plasma screen, or a projection screen.

The display interface 210 can display a processed image 212. The processed image 212 is defined as an area having a number of pixels that has been processed to have a perceived depth when presented on the display interface 210.

Perceived depth means that, when the display interface 210 is viewed from a distance, an object will appear closer or further away relative to other objects or a background in an image. For example, in a three dimensional Cartesian coordinate system with an origin located at the bottom left corner of an image and where the x axis 213 is defined as a reference for the measurement of width, the y-axis 215 is defined as a reference for the measurement of depth, and the z-axis 217 is defined as a reference for the measurement of height. Objects that have a large value for the y-coordinate can have a greater perceived depth than an object with a smaller value for the y-coordinate. Objects with greater perceived depth will appear closer than objects with lesser perceived depth.

As a further example, a user can perceive depth by noticing that objects in the processed image 212 appear outside or in front of the plane of the display interface 210. Similarly, the user can perceive depth by noticing that the objects in the processed image 212 appear within and deeper behind the plane of the display interface 210. For example, the processed image 212 can blur the pixels as a way of expressing distance. The intensity of the brightness and color is also reduced to provide the perceived depth.

The processed image 212 can include a processed foreground object 214 and a processed background 216. The processed foreground object 214 is defined as an object that can have a uniform depth relative to the object's position over a background. Uniform depth means that all parts of the object have the same perceived depth. For example, the processed foreground object 214 can be a soccer player standing upright on a soccer field or a baseball player standing upright in a baseball field. For example in order to provide the same perceived depth to the processed foreground object 214, a blurring and softening of the pixels within the area of the processed foreground object 214 can provide texture and imply a separation between any of the processed foreground object 214 in the processed image 212.

The processed background 216 is defined as the portion of the image that provides a visual base for other objects. The processed background 216 has a gradually or continuously changing perceived depth. For example, the portions of the processed background 216 that are near the bottom of the processed image 212 can have a lesser perceived depth than the portions of the processed background 216 that are near the center or top of the processed image 212. In a specific example of a soccer field, the portions of the soccer field that are near the bottom of the processed image 212 can appear closer and will gradually appear further away towards center and top of the processed image 212.

In general, the processed background 216 can represent a single or uniform background type. For example, the processed background 216 can represent the grass playing field in a soccer game, the ocean in a sailing scene, or the sky. However, the processed background 216 can also be composed of different segments or portions, such as the combination of the soil of a baseball diamond and grass of the infield and outfield or the stadium seating around the grass of a soccer field.

The processed image 212 can have an image viewpoint 218. The image viewpoint 218 is defined as the camera angle of the image. For example, the image viewpoint 218 can be a bird's eye view, such as aerial view from an airplane, helicopter, or blimp, a high angle view, such as a view taken from a crane or an elevated platform in a sports stadium, an eye level view, or a low angle view.

In general, the processed image 212 can have the image view that is a perspective view. The perspective view is defined as a type of the high angle viewpoint that presents large areas of background, such as a stadium or announcer's view of a soccer field or baseball field. The perspective view also generally presents foreground objects as smaller objects over the large areas of background, such as a soccer player or baseball player on the playing field.

Figure 3:
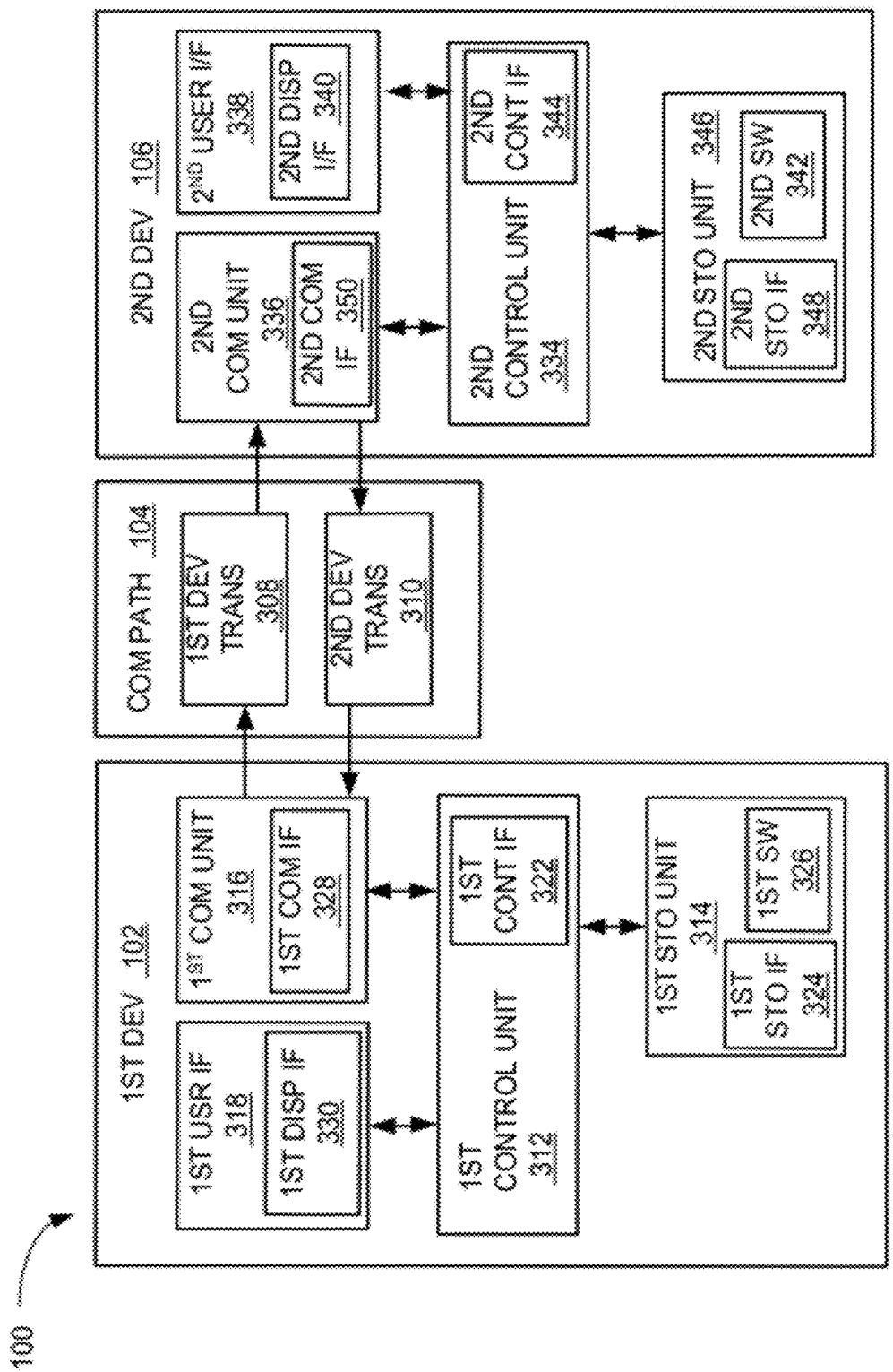
FIG. 3 is an exemplary block diagram of the display system.

Referring now to FIG. 3, therein is shown an exemplary block diagram of the display system 100. The display system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the display system 100 is shown with the first device 102 as a client device, although it is understood that the display system 100 can have the first device 102 as a different type of device. For example, the first device 102 can be a server having a display interface.

Also for illustrative purposes, the display system 100 is shown with the second device 106 as a server, although it is understood that the display system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the display system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the display system 100. The first control unit 312 can also execute the first software 326 for the other functions of the display system 100. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the display system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the display system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the display system 100 is shown with the second storage unit 346 as a single hierarchy storage system, although it is understood that the display system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The display system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the display system 100 is described by operation of the first device 102 and the second device 106. It is understood that the first device 102 and the second device 106 can operate any of the modules and functions of the display system 100.

Figure 4:
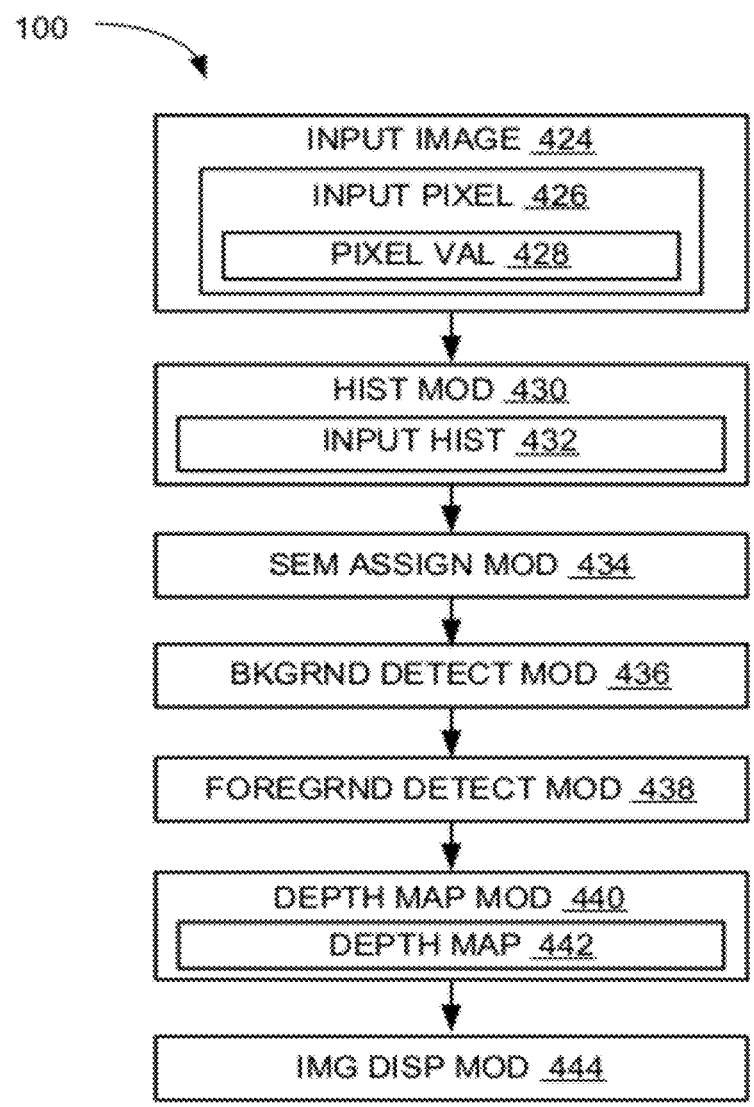
FIG. 4 is a control flow of the display system.

Referring now to FIG. 4, therein is shown a control flow of the display system 100. The display system 100 an include input image 424. The input image 424 is defined as an image received by the first device 102 for displaying on the display interface 210 of FIG. 2. The input image 424 can include input pixels 426, which are defined as the individual pixels used to generate the input image 424, which can be converted to the processed image 212 of FIG. 2.

The input pixels 426 can have a pixel value 428. The pixel value 428 is defined as a value that represents information describing the color of a pixel. For example, the pixel value 428 can be a set of coordinates that represent a specific color in a color space.

The color space is defined as a metric that can be used to describe a specific color. The color space can be represented by a YUV color space. The Y component can determine the luminance or brightness of the colors in an image, where low Y values correspond to low brightness and high Y values correspond to high brightness. The U and the V components can determine the chrominance or color of an image. For example, the U component can be a measure of the blue component of the image and the V component can be a measure of the red component of the image.

As an example, the U and V chrominance components can be measured along an x-axis and a y-axis of the color space. As a further example, the V component can be measured along the y-axis and the U component can be measured along the x-axis.

The pixel value 428 can describe the color of the input pixel 428 based on its coordinates in the color space. For example, the pixel value 428 of (x1, y1) can represent a specific shade of green, while the pixel value 428 of (x2, y2) can represent a specific shade of red.

The display system 100 can include a histogram module 430. The histogram module 430 is for generating a chart or graph of the distribution of values associated with pixels from an image. The histogram module 430 can generate an input histogram 432 from the pixel value 428 of the input image 424.

The input histogram 432 is defined as a two dimensional histogram of the colors represented in an image. The input histogram 432 can represent the frequency of a particular color in input image 424. For example, if a large number of the input pixels 426 have the pixel value 428 representing a shade of green, then the shade of green can have a high frequency. The input histogram 432 can be generated by summing the total number of the input pixels 426 corresponding to a color in the YUV color space according to the pixel value 428.

The display system 100 can include a semantic assignment module 434. The semantic assignment module 434 is for identifying local maxima in a histogram representing an image, classifying the local maxima, and classifying the remaining pixels in the image based on the classified local maxima. Each of these functions will be discussed in greater detail below.

The display system 100 can include a background detection module 436. The background detection module 436 is for determining whether pixels in an image constitute a background in an image based on the total numbers of specified pixel and the density of the specified pixel. Each of these functions will be discussed in greater detail below.

The display system 100 can include a foreground detection module 438. The foreground detection module 438 is for detecting objects over the background in an image by determining if a group of pixels is surrounded by a background of pixels or if a group of pixels is small in quantity relative to the background of pixels. Each of these functions will be discussed in greater detail below.

The display system 100 can include a depth map module 440. The depth map module 440 is for determining if an image provides a specified view and, if a specified view is detected, generating a map of background and foreground objects in an image. Each of these functions will be discussed in greater detail below.

The depth map module 440 can generate a depth map 442. The depth map 442 is defined as a map that represents the depth information for each of the pixels in an image.

The display system 100 can include an image display module 444. The image display module 444 is defined as applying depth information to an input image to generate the processed image 212 for display on a device. The image display module 444 can covert the input image 424 to the processed image 212. The image display module 444 can apply the depth map 442 to the pixels in the input image 424 to generate the processed image 212 for display on the first device 102 of FIG. 1.

The display system 100 can be implemented on the first device 102, on the second device 106 of FIG. 1, or partitioned between the first device 102 and the second device 106. For example, the second device 106 can transmit the input image 424 through the communication path 104 of FIG. 3 as the second device transmission 310 of FIG. 3. The first device 102 can receive the input image 424 with the first communication unit 316 of FIG. 3. The first communication interface 328 of FIG. 3 can transmit the input image 424 to the first storage unit 314 of FIG. 3 or the first control unit 312 of FIG. 3.

The first software 326 of FIG. 3 or the first control unit 312 can execute the histogram module 430, the semantic assignment module 434, the background detection module 436, the foreground detection module 438, the depth map module 440, and the image display module 444.

The first control interface 322 or the first storage interface 324 can transmit the processed image 212 to the first display interface 330 of FIG. 3. The first display interface 330 can receive and display the processed image 212.

The display system 100 describes the module functions or order as an example. The modules can be partitioned differently. For example, the second software 342 can include histogram module 430. Each of the modules can operate individually and independently of the other modules.

Furthermore, data generated in one module can be used by another module without being directly coupled to each other. For example, the semantic assignment module 434 can receive the pixel value 428.

Figure 5:
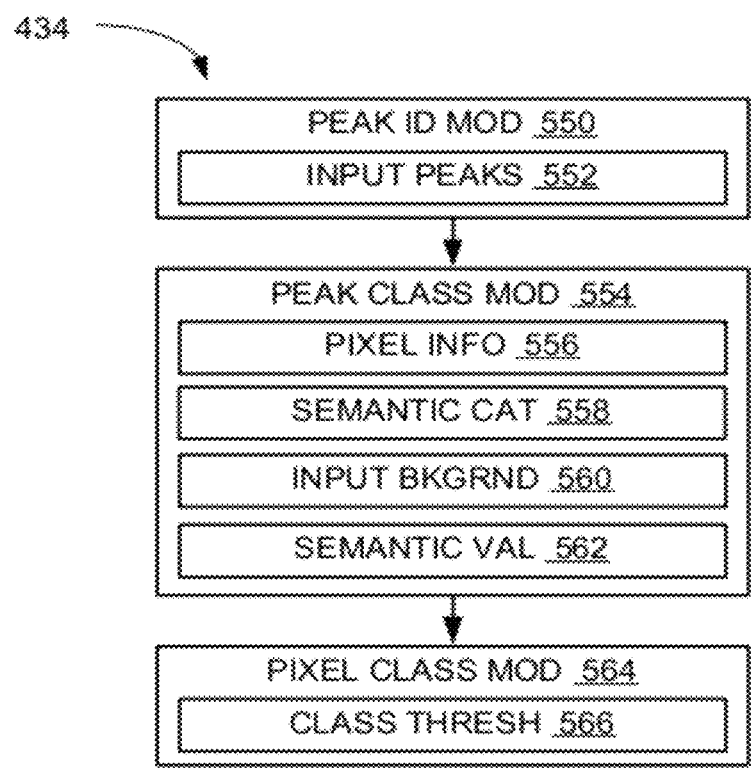
FIG. 5 is a view of the semantic assignment module.

Referring now to FIG. 5, therein is shown a view of the semantic assignment module 434. The semantic assignment module 434 can include a peak identification module 550. The peak identification module 550 is for identifying peaks in a histogram. The peak identification module 550 can identify input peaks 552.

The input peaks 552 are defined as local maxima in the input histogram 432. The local maxima are defined as the colors in the YUV color space that occur with the highest frequency. The input peaks 552 can correspond with a particular one of the pixel value 428 in the input image 424.

The peak identification module 550 can identify the input peaks 552 as local maxima in the input histogram 432. As a specific example, the peak identification 550 can identify up to eight local maxima as the input peaks 552.

The semantic assignment module 434 can include a peak classification module 554. The peak classification module 554 is for classifying local maxima in a histogram. The peak classification module 554 can classify the input peaks 552 according to the pixel information 556.

The pixel information 556 is defined as information identifying the type or nature of object represented by the input peaks 552 or the input pixels 426 in an image. The input peaks 552 and the input pixels 426 can include the pixel information 556. The pixel information 556 can be associated with a semantic category 558.

The semantic category 558 is defined as a category of physical materials or objects that represents are represented in an image. The semantic category 558 can be set for a predefined number of different materials or objects. For example, the semantic category 558 can represent objects or materials, such as grass, water, soil, wood, concrete, or skin. As a further example, the semantic category 558 can represent objects associated with an input background 560 in the input image 424.

The input background 560 is defined as a group of pixels that represent background areas of an image. For example, the input background 560 can represent the processed background 216 in the input image, such as areas of grass on sports playing field, water in an ocean, or the sky.

The semantic category 558 can have a semantic value 562. The semantic value 562 is defined as a value associated with an object or material represented in an image. For example, the semantic value 562 can be based on the color associated with a particular object or material.

The peak classification module 554 can classify the input peaks 552 by comparing the pixel value 428 corresponding to one of the input peaks 552 to the semantic value 562 of the semantic category 558. The peak classification module 554 can assign the pixel information 556 for each of the input peaks 552 corresponding to the semantic category 558.

If the pixel value 428 of the input peaks 552 match the semantic value 562 of one of the semantic category 558, the pixel information 556 of the input peaks 552 can be classified as the semantic category 558 corresponding to the semantic value 562. For example, the input peaks 552 having the pixel value 428 corresponding with the semantic value 562 of grass can have the pixel information 556 of grass.

Conversely, if the pixel value 428 of one of the input peaks 552 does not match the semantic value 562 of one of the semantic category 558, the pixel classification module 554 can classify the pixel information 556 as "miscellaneous" (misc). The semantic category 558 of misc means that the input pixels 426 do not match any of the pre-defined categories of the semantic category 558.

The semantic assignment module 434 can include a pixel classification module 564. The pixel classification module 564 is for assigning semantic information to the pixels in an image. The pixel classification module 564 can classify the input pixels 426 by associating the input pixels 426 and the input peaks 552 with a classification threshold 566.

The classification threshold 566 is defined as used to determine if one value is associated or within a common grouping as another value. The classification threshold 566 can be determined heuristically through iterative or recursive methods.

As a basic example, when comparing one of the input pixels 426 to one of the input peaks 552, if the difference is greater than the classification threshold 566 the two are not related or associated. Conversely, if the difference between one of the input pixels 426 and one of the input peaks 552 is less than the classification threshold 566, then the two can be considered related or associated with one another.

The pixel classification module 564 can use the classification threshold 566 to group one or more of the input pixels 426 with the input peaks 552 based on the pixel value 428. For example, the pixel classification module 564 can calculate the Euclidean distance between the pixel value 428 of one of the input pixels 426 and the pixel value 428 of each of the input peaks 552.

The pixel classification module 564 can associate the input pixels 426 and the input peaks 552 having the shortest Euclidian distance that is below the classification threshold 566.

If the input pixels 426 are associated with one of the input peaks 552, then the input pixels 426 will be classified as having the pixel information 556 that is the same as the associated one of the input peaks 552. Conversely, if the pixel classification module 564 calculates the Euclidean distance between one of the input pixels 426 and the input peaks 552 as greater than the classification threshold 566, then the pixel classification module 564 can classify the pixel information 556 for the input pixels 426 being classified as "misc."

As a specific example, in the case with the input peaks 552 have the pixel information 556 of "grass", "sea", "sky", and "skin", the pixel classification module 564 can compare each of the input pixels 426 with each of the input peaks 552. If the classification threshold 566 is 20, and the pixel classification module 564 calculates the Euclidean distance between one of the input pixels 426 and the input peaks 552 representing "grass," "sea," "sky," and "skin" as 16, 32, 29, and 18, respectively, the pixel classification module 564 can classify the pixel information 556 as "grass." This is because the Euclidian distance between the input pixels 426 being classified and the input peaks 552 representing "grass" is below the classification threshold 566 and lower in value compared to the input peaks 552 representing "skin" which is also below the classification threshold 566.

For illustrative purposes, the pixel classification module 564 can perform statistical analysis based on the Euclidian distance, although it is understood that the classification module can use other methods. For example, the pixel classification module 564 can utilize a Mahalanobis distance or clustering algorithms.

The display system 100 can be implemented on the first device 102 of FIG. 1, on the second device 106 of FIG. 1, or partitioned between the first device 102 and the second device 106. For example, the first storage unit 314 of FIG. 3 or the first control unit 312 of FIG. 3 can store the peak identification module 550, the peak classification module 554, or the pixel classification module 564.

The display system 100 describes the module functions or order as an example. The modules can be partitioned differently. For example, first control unit 312 can store and execute the peak identification module 550 and the first storage unit 314 can store the peak classification module 554. Each of the modules can operate individually and independently of the other modules.

Furthermore, data generated in one module can be used by another module without being directly coupled to each other. For example, the pixel classification module 564 can receive the pixel value 428.

Figure 6:
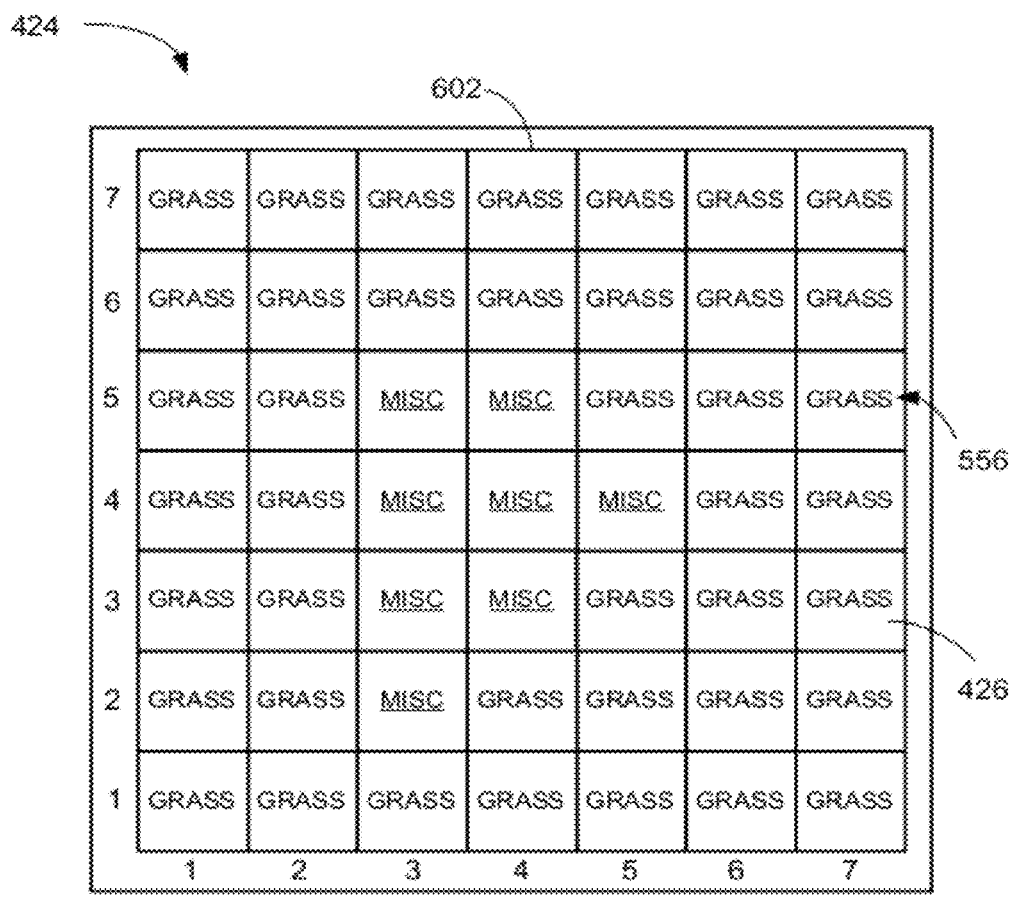
FIG. 6 is an example of a portion of the input image.

Referring now to FIG. 6, therein is shown an example of a portion of the input image 424. The portion of the input image 424 depicts a pixel block 602 of the input pixels 426. The words inside each of the pixels represent the pixel information 556 for each of the input pixels 426. The numbers along the bottom of the pixel block 602 represents the pixel column and the numbers along the left side of the pixel block 602 represents the pixel row. The semantic assignment module 434 of FIG. 4 can assign each of the input pixels 426 the pixel information 556.

For illustrative purposes, the pixel block 602 show a majority of the input pixels 426 with the pixel information 556 as "grass" and a small cluster of pixels in columns 3-5 and rows 3-6 with the pixel information 556 as "misc" although it is understood that the distribution and arrangement of the input pixels 426 having different one of the pixel information 556. For example, the majority of the input pixels 426 in the pixel block 602 can have the pixel information 556 of "sky" or "soil."

Figure 7:
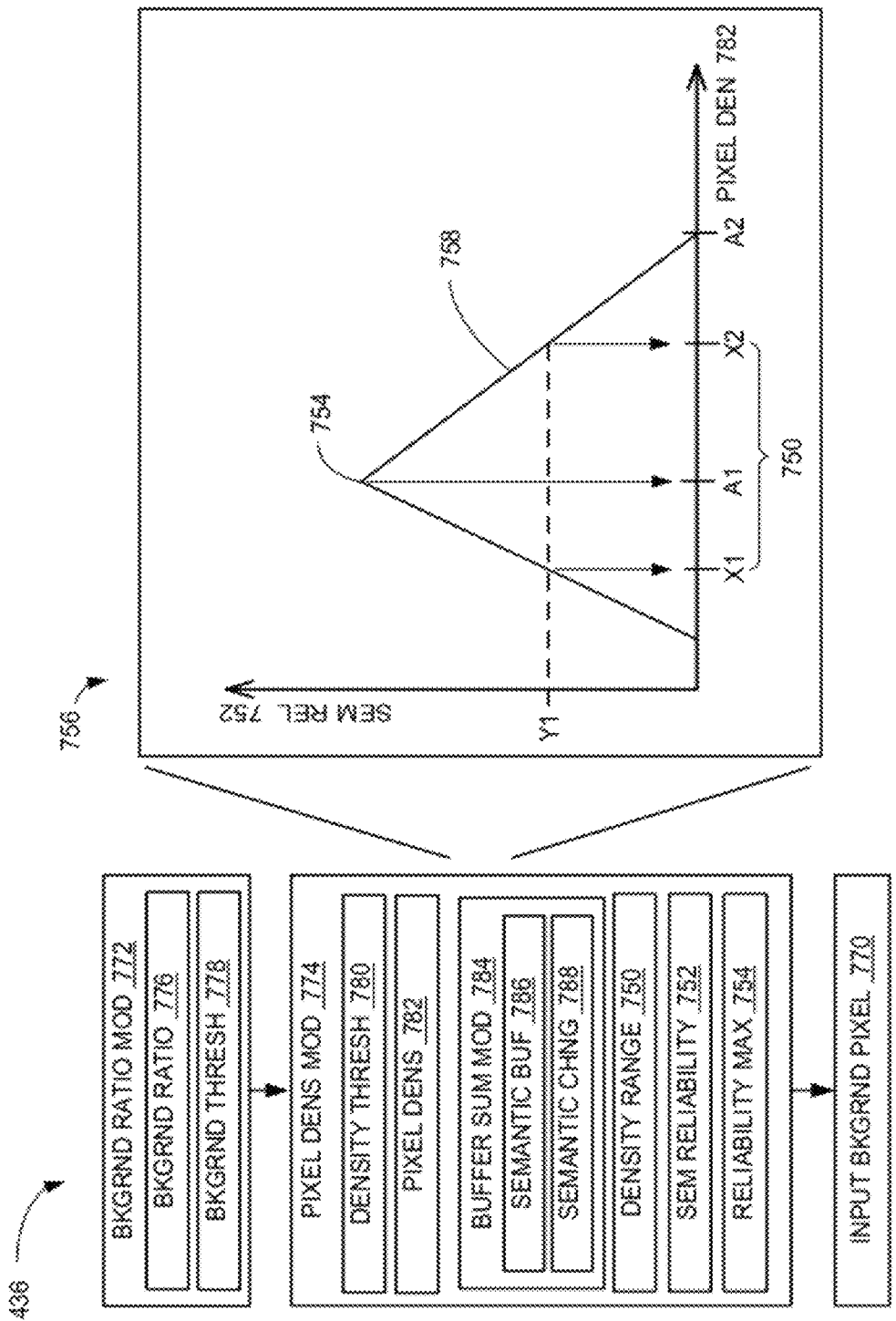
FIG. 7 is a view of the background detection module.

Referring now to FIG. 7, therein is shown a view of the background detection module 436. The background detection module 436 can detect input background pixels 770 with the pixel information 556. The input background pixels 770 are defined as the pixels representing the input background 560.

The background detection module 436 can determine if a number of the input pixels 426 are the input background pixels 770 with a background ratio module 772 and a pixel density module 774. The background ratio module 772 is for determining the ratio of pixels having the same or similar semantic information. The background ratio module 772 can calculate a background ratio 776 based on the pixel information 556 and a ratio threshold 778. The background ratio 776 is defined as the ratio of pixels representing a background to the total number of pixels in an image. The ratio threshold 778 is defined as a value to determine if a ratio of pixels is sufficient to constitute a background.

The background ratio module 772 can calculate the background ratio 776 by summing the number of the input pixels 426 having the same one of the pixel information 556 divided by the total number of the input pixels 426 in the input image 424. The background ratio module 772 can calculate the background ratio 776 for each of the pixel information 556 in the input image 424. For example, for the input pixels 426 having a specific one of the pixel information, if the background ratio 776 is greater than the ratio threshold 778, then the background ratio module 772 can determine that enough of the input pixels 426 exist to constitute the input background pixels 770. In general, the input pixels 426 having the highest one of the background ratio 776 above the ratio threshold 778 constitutes the input background pixels 770. As a specific example, the background ratio 776 can be 78%.

The functionality of the background ratio module 772 can be illustrated with FIG. 6. For example, the background ratio module 772 can calculate the background ratio 776 for the forty-nine of the input pixels 426 in the pixel block 602. The pixel block 602 contains the input pixels 426 having the pixel information 556 of "grass" and the input pixels 426 having the pixel information 556 of "misc." The background ratio module 772 can determine that there are forty-one of the input pixels 426 with the pixel information 556 of "grass," thus the background ratio 776 is be forty-one to forty-nine, or approximately 0.84. Similarly, the background ratio module 772 would determine that there are eight of the input pixels 426 with the pixel information 556 of "misc", thus the background ratio 776 would be eight to forty-nine, or approximately 0.16. As an example, if the ratio threshold 778 is 0.80, then the background ratio module 772 can determine that the input pixels 426 having the pixel information 556 of "grass" constitutes enough of the input pixels 426 to be the input background pixels 770.

The pixel density module 774 is for determining whether pixels associated with a specific semantic information have sufficient density to constitute the background of an image. The pixel density module 774 can determine if the input pixels 426 having a specific one of the pixel information 556 constitute the input background pixels 770 based on a density threshold 780 and a pixel density 782.

The density threshold 780 is defined as a value to determine if a density of a group of pixels is sufficient to constitute a background. The pixel density threshold 780 can be determined heuristically through iterative or recursive methods.

The pixel density 782 is defined as a ratio of the total number of pixels having the same semantic information to the number of instances pixels having the same semantic information are adjacent to pixels having different semantic information. The pixel density module 774 can calculate the pixel density 782 by dividing the total number of the input pixels 426 having the same one of the pixel information 556 by a semantic buffer 786. The semantic buffer 786 is the total number of instances pixels having specific semantic information is adjacent to pixels having different semantic information.

The pixel density module 774 can include a buffer sum module 784. The buffer sum module 784 is for tracking the change in properties from one pixel to another pixel. The buffer sum module 784 can calculate the semantic buffer 786 by summing up a semantic change 788 for each of the input pixels 426.

The semantic change 788 is defined as the change in the semantic information between one pixel and another adjacent pixel. For example, a first one of the input pixels 426 can have the pixel information 556 of "grass" while a second adjacent one of the input pixels 426 can have the pixel information 556 corresponding to "soil." The semantic change 788 between the first one of the input pixels 426 and the second one of the input pixels 426 is one.

On a two dimensional plane, each of the input pixels 426 can have the semantic change 788 of up to four. The input pixels 426 having a square shape can share a border or side with four other of the input pixels 426, with the exception of the input pixels 426 along the edge or at the corner of the input image 424. More specifically, one of the input pixels 426 can share a side with another one of the input pixels 426 above, below, to the left, and to the right. Each of the input pixels 426 can be adjacent to as many as four of the input pixels 426 with different ones of the pixel information 556. Similarly, the input pixels 426 that are located along the edge can have the semantic change 788 of up to three and the input pixels 426 located at the corners of the input image 424 can have a semantic change of up to two.

The buffer sum module 784 can calculate the semantic buffer 786 for each of the pixel information 556 present in the input image 424. For example, if the peak classification module 554 of FIG. 5 identifies the input peaks 552 of FIG. 5 having the pixel information 556 of "grass," "soil," and "misc," the pixel density module 774 can calculate the semantic buffer 786 corresponding to "grass," "soil," and "misc."

The buffer sum module 784 can check each of the input pixels 426 to determine the semantic change 788 for each of the pixel information 556. The buffer sum module 784 can increase the value of the semantic buffer 786 each time the buffer sum module 784 detects the semantic change 788 for one of the input pixels 426 having a specific one of the pixel information 556.

After the buffer sum module 784 calculates the semantic buffer 786, the pixel density module 774 can determine the pixel density 782 by dividing the total number of the input pixels 426 having the same one of the pixel information 556 by the corresponding one of the semantic buffer 786. If the pixel density 782 is greater than the density threshold 780, then the pixel density module 774 can determine that the input pixels 426 of a specific one of the pixel information 556 is sufficient to constitute the input background pixels 770. In general, the input pixels 426 having the highest one of the pixel density 782 above the density threshold 780 constitutes the input background pixels 770.

The functionality of the pixel density module 774 and the buffer sum module 784 can be illustrated by FIG. 6. For example, in the pixel block 602, the buffer sum module 784 can calculate the semantic buffer 786 for the pixel information 556 of "grass" and "misc", respectively. The buffer sum module 784 can scan each row of the input pixels 426 to check for the semantic change 788. For example, the buffer sum module 784 can scan the first row and increase the semantic buffer 786 for the pixel information 556 of grass to one since the input pixels 426 at (3, 1) has the semantic change 788 with the input pixels 426 above at (3, 2).

Similarly, the buffer sum module 784 can scan the second row and increase the semantic buffer 786 for the pixel information 556 of grass by three, to a total of four. This is because the input pixels 426 at (2, 2) has the semantic change 788 with the input pixels 426 to the right at (3, 2), the input pixels 426 at (4, 2) also has the semantic change 788 with the (3, 2) to the left and above at (4, 3). The buffer sum module 784 can repeat the scan for each of the rows for the semantic change 788 in the pixel block 602 to calculate the semantic buffer 786 the pixel information 556 of "grass" as fourteen.

Further, the pixel density module 774 can calculate the pixel density 782 for the input pixels 426 having the pixel information 556 of "grass" as approximately 2.9, or forty-one divided by fourteen. As an example, if the density threshold 780 is 2.5, then the pixel density module 774 can determine that the input pixels 426 having the pixel information 556 of "grass" are sufficient to constitute the input background pixels 770.

The background detection module 436 can determine if the input pixels 426 having the pixel information 556 matching one of the semantic category 558 are the input background pixels 770. If the background ratio module 772 determines that the background ratio 776 is greater than the ratio threshold 778 and the pixel density module 774 determines that the pixel density 782 is greater than the density threshold 780, then the background detection module 436 can determine that the input pixels 426 corresponding with one of the semantic category 558 are the input background pixels 770.

In general, the input pixels 426 having both the highest one of the background ratio 776 and the highest one of the pixel density 782 will be determined as the input background pixels 770. However, in some cases, the input background pixels 770 can be include different segments or portions the input pixels 426 having different ones of the pixel information 556. For example, the input pixels 426 representing the combination of the soil of a baseball diamond and grass of the infield and outfield or the stadium seating around the grass of a soccer field can be represented by the input background pixels 770.

Alternatively, the pixel density module 774 can determine whether input pixels 426 associated with a specific one of the pixel information 556 constitute the input background pixels 770 when the pixel density 782 for the input pixels 426 is within a density range 750.

The density range 750 is defined as a range of the pixel density 782 corresponding to a semantic reliability 752. The semantic reliability 752 is defined as a measure of the accuracy of segmenting or grouping pixels in an image based on the difference in semantic information. The semantic reliability can be a function of the pixel density 782.

In general, the semantic reliability 752 can increase with increasing values of the pixel density 782 until the semantic reliability 752 reaches a reliability maximum 754 then decrease in with increasing values of the pixel density 782 after the reliability maximum 754. The reliability maximum 754 is defined as the maximum value of the semantic reliability 752 for the input image 424.

The relationship between the semantic reliability 752 and the pixel density 782 can be illustrated in a reliability chart 756 with a reliability curve 758. The x-axis of the reliability chart 756 can represent the measure of pixel density 782 and the y-axis can represent the measure of semantic reliability 752.

The reliability curve 758 can increase from the semantic reliability 752 having a value of zero to the reliability maximum 754. The reliability maximum 754 can be the maximum value of the semantic reliability 752, as illustrated by the peak of the reliability curve 758. As an example, the reliability maximum 754 can correspond to a value of the pixel density 782 that is equivalent to a fraction of the total number of input pixels 426 in the width of the input image 424, as depicted by point A1 along the x-axis. As a specific example, the fraction can be the total number of pixels of the processed foreground object 214, or pixels associated with the processed foreground object 214, divided by the total number of input pixels 426 in the width of the input image 424.

The reliability curve 758 can decrease after the reliability maximum 754 to the semantic reliability 752 having a value of zero. As an example, reliability curve 752 can the semantic reliability 752 having a value of zero at a value of the pixel density 782 that is equivalent to three times a fraction of the total number of input pixels 426 in the width of the input image 424, as depicted by point A2 along the x-axis. As a specific example, the fraction can be the total number of pixels of the processed foreground object 214, or pixels associated with the processed foreground object 214, divided by the total number of input pixels 426 in the width of the input image 424.

The density range 750 can be the values of the pixel density 782 that are equal to or between the pixel density 782 corresponding to half the value of the reliability maximum 754 along the reliability curve 758, as depicted by the points "X1" and "X2" along the x-axis. The half value of the reliability maximum 754 is depicted on the reliability chart 756 by the point "Y1" and the dashed line. The pixel density module 774 can determine the input pixels 426 having a specific one of the pixel information 556 as the input background pixels 770 when the pixel density 782 for the input pixels 426 is within the density range 750.

It has been discovered that the present invention provides the display system 100 with improved detection of the input background pixels 770. The background detection module 436 can more accurately determine the input pixels 426 as the input background pixels 770 with the background ratio module 772 and the pixel density module 774 by using the pixel information 556 to distinguish between the input pixels 426 that represent the input background 560 and those that do not represent the input background 560, thus providing improved detection of the input background pixels 770.

The display system 100 can be implemented on the first device 102 of FIG. 1, on the second device 106 of FIG. 1, or partitioned between the first device 102 and the second device 106. For example, the first software 326 of FIG. 3 or the first control unit 312 of FIG. 3 can execute the background ratio module 772 and the pixel density module 774.

The display system 100 describes the module functions or order as an example. The modules can be partitioned differently. Each of the modules can operate individually and independently of the other modules. Furthermore, data generated in one module can be used by another module without being directly coupled to each other.

Figure 8:
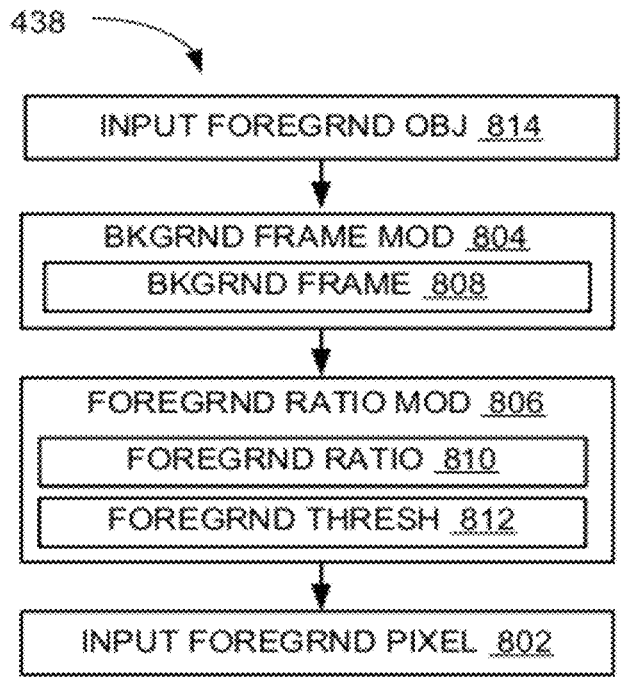
FIG. 8 is a view of the foreground detection module.

Referring now to FIG. 8, therein is shown a view of the foreground detection module 438. The foreground detection module 438 can identify input foreground pixels 802 over the input background 560 of the input image 424 using a background frame module 804, a foreground ratio module 806, or a combination thereof.

The input foreground pixels 802 are defined as a group of pixels that represent an object over a background of an image. The input foreground pixels 802 can represent an input foreground object 814. The input foreground object 814 can represent objects that move over the background, human being, such as a soccer player or baseball player, vehicles such as an automobile or motorcycle, or animals, such as a horse or a dog. The foreground detection module 438 can identify the input foreground pixels 802 from the input pixels 426 with the input background pixels 770.

The input foreground pixels 802 can be a group of the input pixels 426 having the pixel information 556 of "misc." In general, the input foreground pixels 802 can be partially or completely surrounded by the input background pixels 770 of FIG. 7. As a specific example, the input foreground pixels 802 can be a group of the input pixels 426 that represent an image of a soccer player and the input background pixels 770 can represent grass on a playing field.

The background frame module 804 is for determining whether an object is framed or surrounded by a background.

The background frame module 804 can segment the input background pixels 770 in the input image 424 into a background frame 808. The background frame 808 is a group or block of the input background pixels 770. The background frame 808 can be a predetermined number of the input background pixels 770 having a specific frame shape, such as a square block of the input background pixels 770, or can constitute the entire body of the input background pixels 770.

The background frame module 804 can search the background frame 808 for the input foreground pixels 802. The background frame module 804 can search within the background frame 808 for the input pixels 426 or a group of the input pixels 426 having the pixel information 556 of "misc." If the background frame module 804 determines that the input pixels 426 corresponding to "misc" are surrounded by the input background pixels 770, the background frame module 804 can identify the input pixels 426 corresponding to "misc" as the input foreground pixels 802.

The functionality of the background frame module 804 can be illustrated by FIG. 6. For example, assume the background detection module 436 of FIG. 7 determined the input background pixels 770 as the input pixels 426 having the pixel information 556 of "grass." The background frame module 804 can segment a block of the input background pixels 770 according to the pixel block 602. The background frame module 804 can search within the pixel block 602 can identify all of the input pixels 426 having the pixel information 556 of "misc" and determine that the group of the input pixels 426 are surrounded by the input background pixels 770. Thus, the background frame module 804 would determine that the group of the input pixels 426 is the input foreground object 814.

Alternatively, the foreground detection module 438 can utilize the foreground ratio module 806 to identify the input foreground pixels 802. The foreground ratio module 806 is for determining whether a particular group of pixels within a background of an image is small relative to the number of pixels in the background. The foreground ratio module 806 can determine if a group of the input pixels 426 constitute the input foreground pixels 802 based on a foreground ratio 810 and a foreground threshold 812.

The foreground ratio 810 is defined as a ratio of pixels with the same semantic information to the total number of pixels in a background. The foreground ratio 810 can be calculated as the number of the input pixels 426 having the pixel information 556 corresponding to a semantic category of "misc" within the input background pixels 770 divided by the total number of the input background pixels 770.

The foreground threshold 812 is defined as a value to determine if a group of pixels is sufficiently small relative to a background to constitute an object in the foreground of an image. If the foreground ratio 810 is below than the foreground threshold 812, then the foreground ratio module 806 can identify the input pixels 426 corresponding to "misc" as the input foreground pixels 802. For example, the foreground threshold 812 can be determined based on the number of the input pixels 426 corresponding to "misc" in the height and width dimension.

The functionality of the foreground ratio module 806 can be illustrated by FIG. 6. For example, assume the background detection module 436 determined the input background pixels 770 as the input pixels 426 having the pixel information 556 of "grass." The foreground ratio module 806 can search within the pixel block 602 and sum all of the input pixels 426 having the pixel information 556 of "misc" for a total of eight of the input pixels 426. The foreground ratio module 806 can calculate the foreground ratio 810 of eight to forty-one, or approximately 0.195. If the foreground threshold 812 is 0.2, then the input pixels 426 having the pixel information 556 of "misc" can be the input foreground pixels 802.

It has been discovered that the present invention provides the display system 100 with improved detection of the input foreground pixels 802. The foreground detection module 438 can accurately determine the input pixels 426 as the input foreground object 814 with the background frame module 804 and the foreground ratio module 806. The pixel information 556 can be used to distinguish between the input pixels 426 that represent the input background 560 and those that represent the input foreground object 814, thus providing improved detection of the input foreground pixels 802.

The display system 100 can be implemented on the first device 102 of FIG. 1, on the second device 106 of FIG. 1, or partitioned between the first device 102 and the second device 106. For example, the first storage unit 314 of FIG. 3 or the first control unit 312 of FIG. 3 can store the background frame module 804 or the foreground ratio module 806.

The display system 100 describes the module functions or order as an example. The modules can be partitioned differently. For example, first control unit 312 can store and execute the background frame module 804 and the first storage unit 314 can store the foreground ratio module 806. Each of the modules can operate individually and independently of the other modules. Furthermore, data generated in one module can be used by another module without being directly coupled to each other.

Figure 9:
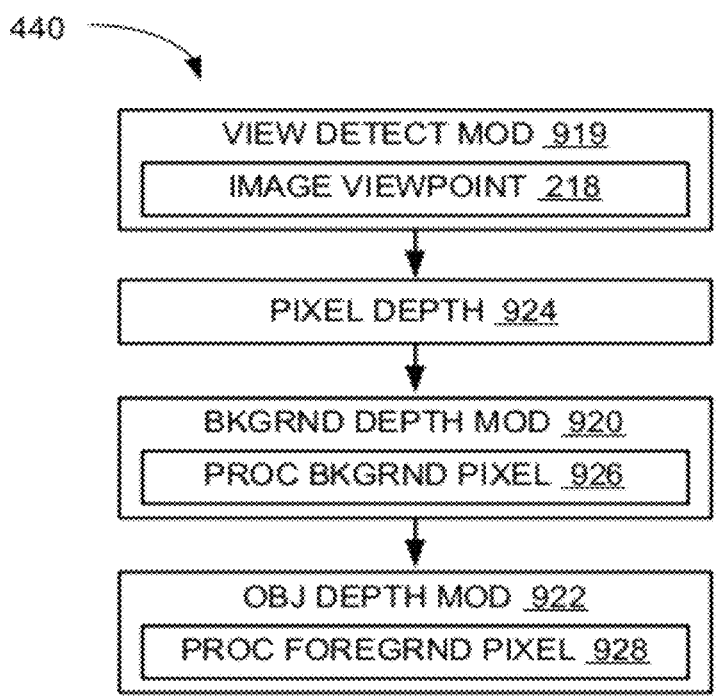
FIG. 9 is a view of the depth map module.

Referring now to FIG. 9, therein is shown a view of the depth map module 440. The depth map module 440 can include a view detection module 919. The view detection module 919 is for determining if an image provides a specific viewpoint or camera angle. The view detection module 919 can determine the image viewpoint 218 of the input image 424.

The image viewpoint 218 can be determined by analysis of the input image 424. For example, view detection module can determine if the image viewpoint 218 is the perspective view. As a specific example, the view detection module 919 as the perspective view if can determine if a large number of the input background pixels 770 have the same one of the pixel information 556 of if the number of the input foreground pixels 802 is small compared to the input background pixels 770. Alternatively, the image viewpoint 218 can be provided by the second device 106.

The depth map module 440 can assign a pixel depth 924 to the input background pixels 770 and the input foreground pixels 802. The pixel depth 924 is defined as a measure of the perceived distance or perceived depth of an object or background. For example, if a first one of the input pixels 426 has the pixel depth 924 that is greater than that of a second one of the input pixels 426, then the first one of the input pixels 426 can appear closer that the second one of the input pixels 426.

The depth map module 440 can assign the pixel depth 924 to the input pixels 426 based on the image viewpoint 218. If the view detection module 919 determines that the image viewpoint 218 is the perspective view, then the depth map module 440 can generate the depth map 442 for the input image 424 with a background depth module 920 and an object depth module 922.

The depth map module 440 can include a background depth module 920. The background depth module 920 is for assigning depth to the background of an image. The background depth module 920 can assign each of the input background pixels 770 in the same row identical values of the pixel depth 924 to generate processed background pixels 926.

The processed background pixels 926 are defined as the input background pixels 770 with assigned values of the pixel depth 924. The processed background pixels 926 can have the perceived depth. The processed background pixels 926 can represent the processed background 216 of FIG. 2.

The background depth module 920 can increase the value of the pixel depth 924 at a constant rate. For example, the background depth module 920 can scan the rows of the input pixels 426 for the input background pixels 770 beginning with the first or bottom most rows of the input pixels 426 in the input image 424. As a specific example, the first row of the input pixels 426 detected to have the input background pixels 770 can be assigned the lowest value of the pixel depth 924 for the input image 424.

The value of the pixel depth 924 for the input background pixels 770 in each of the subsequent row of the input pixels 426 can be increased at a constant rate. Increasing the value of the pixel depth 924 at a constant rate can generate the processed background 216 having a uniformly increasing perceived depth.

The depth map module 440 can include the object depth module 922. The object depth module 922 is for assigning uniform depth to each of the objects over a background. The object depth module 922 can generate the processed foreground object 214 having uniform perceived depth by assigning each of the input foreground pixels 802 of one of the input foreground object 814 the same value of the pixel depth 924.

The object depth module 922 can assign each of the input foreground pixels 802 the pixel depth 924 of the processed background pixels 926 adjacent to the input foreground pixels 802. More specifically as an example, the object depth module 922 can assign the pixel depth 924 for the input foreground pixels 802 based on the processed background pixels 926 having the lowest value of the pixel depth 924.

For example, the object depth module 922 can scan each row of the processed background pixels 926, beginning from the bottom of the input image 424, for the input foreground pixels 802. If the object depth module 922 detects one of the input foreground pixels 802 adjacent to one of the processed background pixels 926, each of the input foreground pixels 802 of one of the input foreground object 814 can be assigned the pixel depth 924 of the adjacent one of the processed background pixels 926. In general, the processed background pixels 926 closer to the bottom of the input image 424 will have lower values of the pixel depth 924, thus, each of the input foreground pixels 802 in one of the input foreground object 814 can have the lowest possible value of the pixel depth 924.

The object depth module 922 can generate processed foreground pixels 928. The processed foreground pixels 928 are input foreground pixels 802 with assigned values of the pixel depth 924.

The depth map module 440 can generate the depth map 442 with the input background pixels 770 and the input foreground pixels 802. The depth map 442 can be a map of each the input pixels 426 in the input image 424 with assigned values of the pixel depth 924.

The physical transformation from displaying the processed image 212 results in movement in the physical world, such as people moving in response to the processed image 212 when playing games or viewing a 3d image. The first display interface 330 can display the processed image 212 by manipulating the pixels on the first device 102, thus resulting in movement in the physical world The display system 100 can be implemented on the first device 102 of FIG. 1, on the second device 106 of FIG. 1, or partitioned between the first device 102 and the second device 106. For example, the first software 326 of FIG. 3 or the first control unit 312 of FIG. 3 can store the view detection module 919, the background depth module 920, and the object depth module 922.

The display system 100 describes the module functions or order as an example. The modules can be partitioned differently. For example, the view detection module 919 can be provided by the second device 106. Each of the modules can operate individually and independently of the other modules. Furthermore, data generated in one module can be used by another module without being directly coupled to each other.

Figure 10:
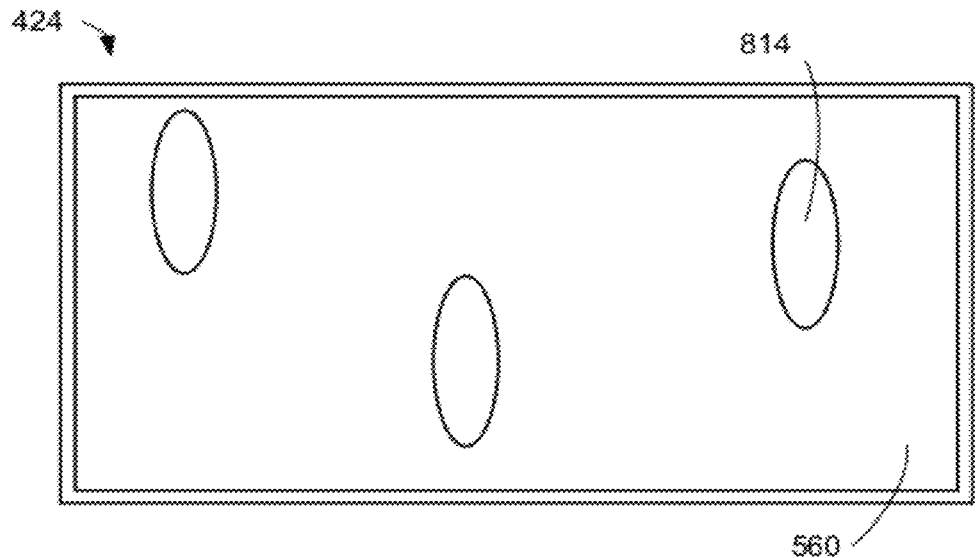
FIG. 10 is an example of the input image.

Referring now to FIG. 10, therein is shown an example of the input image 424. The input image 424 represents an image prior to conversion to the processed image 212 of FIG. 2. The input image 424 can have the input background 560. As an example, the input background 560 can represent stationary objects or materials, such as grass on a playing field, soil on a racking track, concrete on a road or playground, water in a lake or ocean, or other that are typical as background.

The input image 424 can include the input foreground object 814. The input foreground object 814 can be over the input background 560. The input foreground object 814, depicted by the solid oval lines, can represent objects that move over the background, human being, such as a soccer player or baseball player, vehicles such as an automobile or motorcycle, or animals, such as a horse or a dog.

Figure 11:
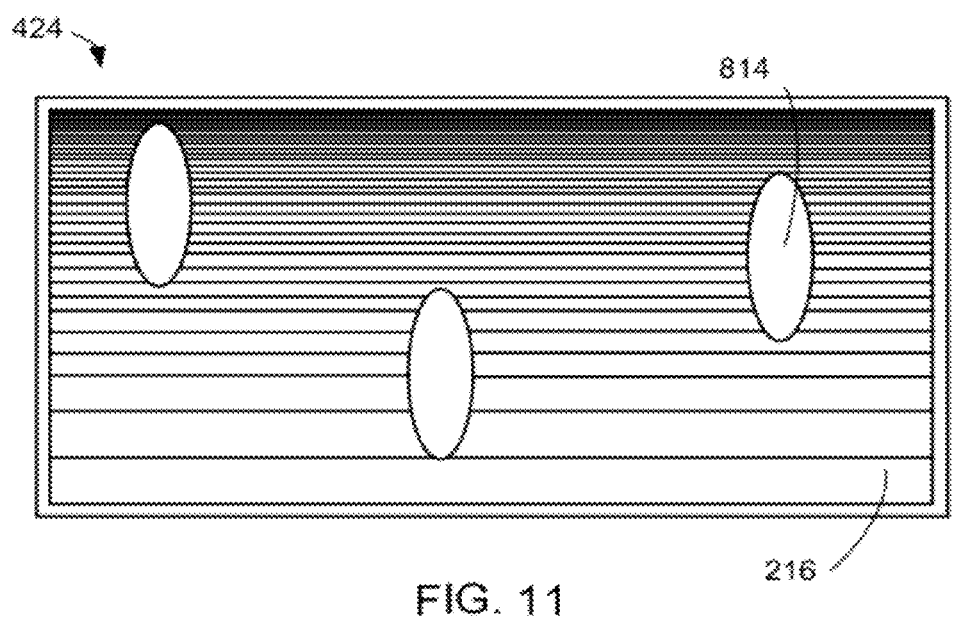
FIG. 11 is an example of the input image having the processed background.

Referring now to FIG. 11, therein is shown an example of the input image 424 having the processed background 216. The image display module 444 can apply the depth map 442 to the input background of FIG. 10 to generate the processed background 216.

The processed background 216 can have perceived depth, as determined by the pixel depth 924 of FIG. 9 of the processed background pixels 926 of FIG. 9. The perceived depth is depicted by the horizontal lines. Areas in the processed background 216 having lower line density represent the areas that have a closer perceived depth than areas having a higher line density. For example, the portions at the bottom of the processed background 216 can appear closer, which has low line density, compared to portions at the top of the processed background, which has higher line density, as depicted at the bottom portion of the input image 424.

Figure 12:
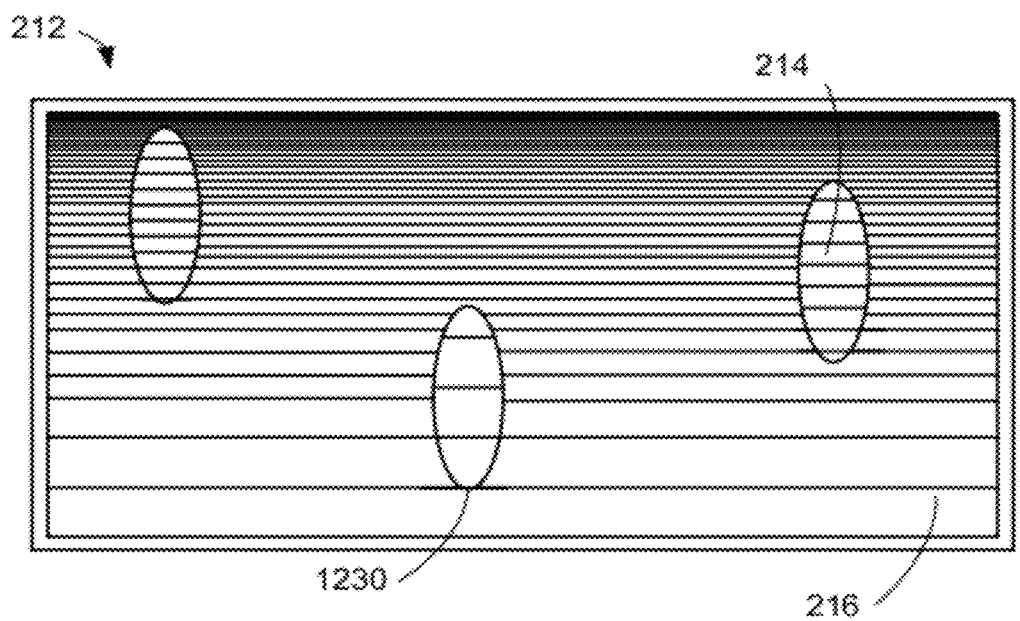
FIG. 12 is an example of the processed image.

Referring now to FIG. 12, therein is shown an example of the processed image 212. The processed image 212 depicts the processed foreground object 214 over the processed background 216. The image display module 444 of FIG. 4 can apply the depth map 442 of FIG. 4 to the input foreground object 814 of FIG. 10 to generate the processed foreground object 214.

Each of the processed foreground object 214 in the processed image 212 can have the perceived depth, as determined by the pixel depth 924 of the processed foreground pixels 928. The processed foreground object 214 can have the same perceived depth as the portion of processed background that is at an object base 1230, which is the bottom-most portion of the processed foreground object 214

The perceived depth can be depicted by the horizontal lines within the solid oval lines. The processed foreground object 214 having lower line density have a closer perceived depth those having a high line density.

Figure 13:
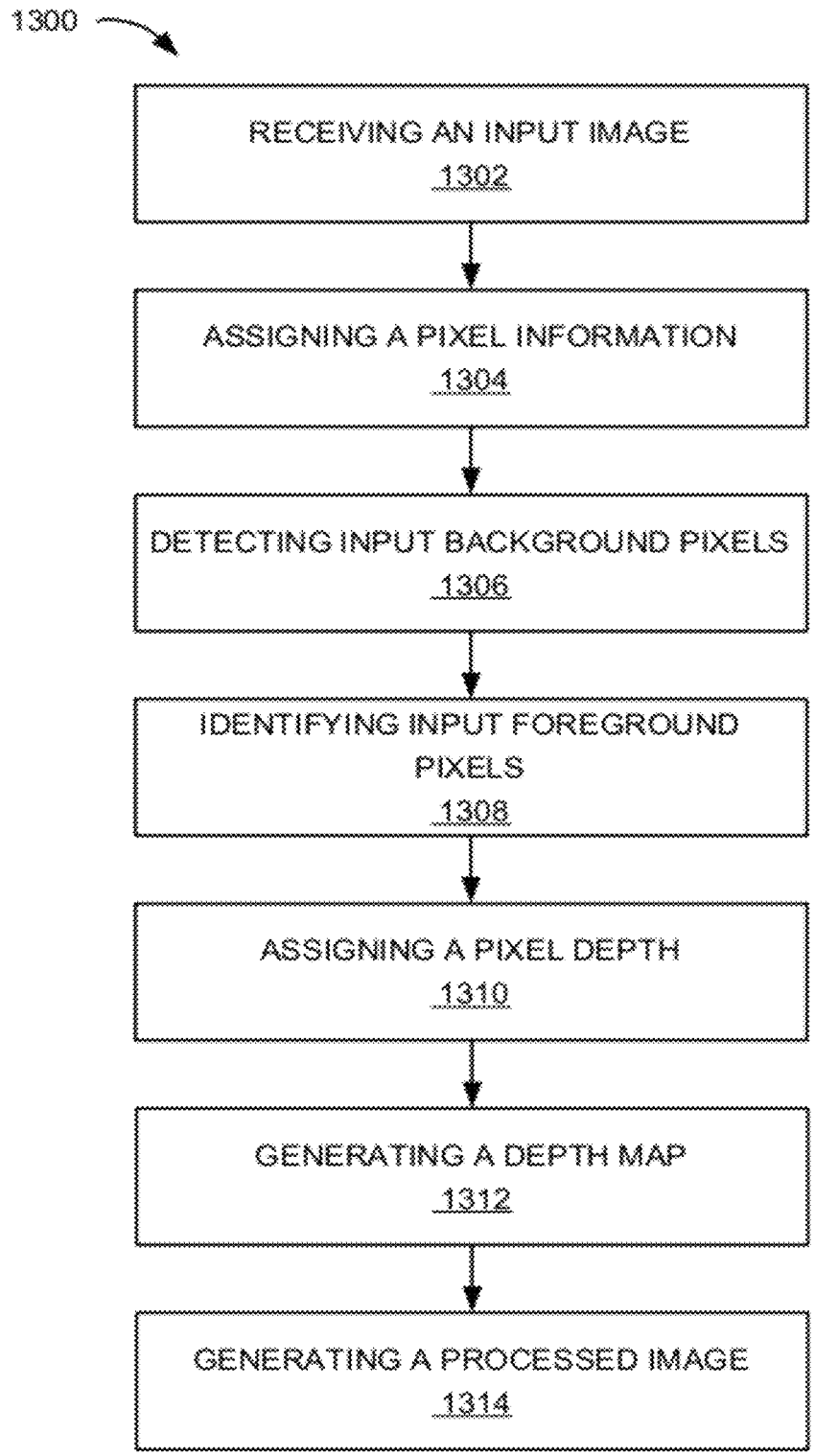
FIG. 13 is a flow chart of a method of operation of a display system in a further embodiment of the present invention.

Referring now to FIG. 13, therein is shown a flow chart of a method 1300 of operation of a display system in a further embodiment of the present invention. The method 1300 includes: receiving an input image having input pixels in a block 1302; assigning a pixel information for the input pixels corresponding to a semantic category in a block 1304; detecting input background pixels from the input pixels with the pixel information in a block 1306; identifying input foreground pixels from the input pixels with the input background pixels in a block 1308; assigning a pixel depth to the input background pixels and input foreground pixels in a block 1310; generating a depth map with the input background pixels and the input foreground pixels in a block 1312; and generating a processed image from the input image with the depth map for displaying on a device in a block 1314.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a display system comprising:
receiving an input image having input pixels;
assigning a pixel information for the input pixels corresponding to a semantic category;
detecting input background pixels from the input pixels with the pixel information based on pixel density;
identifying input foreground pixels from the input pixels with the input background pixels;
assigning a pixel depth to the input background pixels to generate processed background pixels;
assigning the pixel depth to the input foreground pixels based on the pixel depth of the processed background pixels adjacent to the input foreground pixels;
generating a depth map with the input background pixels and the input foreground pixels; and
generating a processed image from the input image with the depth map for displaying on a device.

2. The method as claimed in claim 1 wherein assigning the pixel information includes:
comparing a pixel value of the input pixels and a semantic value of the semantic category; and
classifying the pixel information as the semantic category when the pixel value is the same as the semantic value.

3. The method as claimed in claim 1 wherein assigning the pixel depth to the input background pixels and the input foreground pixels includes:
generating the processed background pixels having a perceived depth; and
generating processed foreground pixels having the perceived depth.

4. The method as claimed in claim 1 wherein assigning the pixel depth includes assigning the pixel depth based on an image viewpoint of the input image.

5. The method as claimed in claim 1 further comprising:
generating an input histogram of a pixel value of the input pixels;
classifying input peaks of the input histogram with the pixel value based on the semantic category; and
wherein:
assigning the pixel information of the input pixels includes associating the input pixels with the input peaks.

6. A method of operation of a display system comprising:
receiving an input image having input pixels;
generating an input histogram from a pixel value of the input pixels;
classifying input peaks of the input histogram corresponding to a semantic category,
assigning a pixel information for the input pixels based on comparison with the input peaks, the pixel information corresponding to the semantic category;
detecting input background pixels from the input pixels with the pixel information based on pixel density;
identifying input foreground pixels from the input pixels with the input background pixels;
assigning a pixel depth to the input background pixels to generate processed background pixels;
assigning the pixel depth to the input foreground pixels based on the pixel depth of the processed background pixels adjacent to the input foreground pixels;
generating a depth map with the input background pixels and the input foreground pixels; and
generating a processed image from the input image with the depth map for displaying on a device.

7. The method as claimed in claim 6 detecting the input background pixels includes:
comparing a background ratio of the input pixels with a ratio threshold; and
determining the input pixels as the input background pixels when the background ratio is greater than the ratio threshold.

8. The method as claimed in claim 6 wherein detecting the input background pixels includes:
comparing the pixel density of the input pixels with a density threshold; and
determining the input pixels as the input background pixels when the pixel density is greater than the density threshold.

9. The method as claimed in claim 6 wherein detecting the input foreground pixels includes searching a background frame of the input background pixels for the input foreground pixels.

10. The method as claimed in claim 6 wherein assigning the pixel depth to the input background pixels includes assigning the pixel depth at a constant rate.

11. A display system comprising:
a communication unit configured to receive an input image having input pixels; and
a control unit, coupled to the communication unit, configured to:
assign a pixel information for the input pixels corresponding to a semantic category;
detect input background pixels from the input pixels with the pixel information based on pixel density;
detect input foreground pixels from the input pixels with the input background pixels;
assign a pixel depth to the input background pixels to generate processed background pixels;
assign the pixel depth to the input foreground pixels based on the pixel depth of the processed background pixels adjacent to the input foreground pixels;
generate a depth map with the input background pixels and the input foreground pixels; and generate a processed image, from the input image with the depth map, for displaying on a device.

12. The system as claimed in claim 11 wherein the control unit is configured to classify the pixel information as the semantic category when a pixel value of the input pixels is the same as a semantic value of the semantic category.

13. The system as claimed in claim 11 wherein the control unit is configured to generate the processed background pixels having a perceived depth.

14. The system as claimed in claim 11 wherein the control unit is configured to assign the pixel depth based on an image viewpoint.

15. The system as claimed in claim 11 wherein control unit is configured to:
  generate an input histogram of a pixel value of the input pixels; and
  classify input peaks of the input histogram with the pixel value based on the semantic category; and
  assign the pixel information of the input pixels associated with the input peaks.

16. The system as claimed in claim 11 wherein control unit is configured to:
  generate an input histogram from the input image; and
  classify input peaks of the input histogram corresponding to the semantic category; and
  assign the pixel information of the input pixels based on comparison with the input peaks, the pixel information corresponding to the semantic category.

17. The system as claimed in claim 16 wherein the control unit is configured to determine the input pixels as the input background pixels when a background ratio of the input pixels is greater than a ratio threshold.

18. The system as claimed in claim 16 wherein the control unit is configured to determine the input pixels as the input background pixels when the pixel density of the input pixels is greater than a density threshold.

19. The system as claimed in claim 16 wherein the control unit is configured to search a background frame of the input background pixels for the input foreground pixels.

20. The system as claimed in claim 16 wherein the control unit is configured to assign pixel depth to the input background pixels at a constant rate.

* * * * *